United States Patent
Bouchard

(10) Patent No.: US 11,320,057 B2
(45) Date of Patent: May 3, 2022

(54) ANTI-RAT VALVE AND FLAP THEREFOR

(71) Applicant: Reseau Drain Corp., Laval (CA)

(72) Inventor: Jean-Pierre Bouchard, Laval (CA)

(73) Assignee: RESEAU DRAIN CORP., Laval (CA)

( * ) Notice: Subject to any disclaimer, the term of this patent is extended or adjusted under 35 U.S.C. 154(b) by 281 days.

(21) Appl. No.: 16/782,785

(22) Filed: Feb. 5, 2020

(65) Prior Publication Data
US 2020/0248825 A1 Aug. 6, 2020

Related U.S. Application Data

(60) Provisional application No. 62/801,164, filed on Feb. 5, 2019.

(51) Int. Cl.
*F16K 15/03* (2006.01)
*A01M 29/30* (2011.01)

(52) U.S. Cl.
CPC ............ *F16K 15/03* (2013.01); *A01M 29/30* (2013.01); *A01M 2200/00* (2013.01); *F16K 15/034* (2021.08)

(58) Field of Classification Search
CPC ...... F16K 15/03; F16K 15/034; A01M 29/30; A01M 2200/00; Y10T 137/7902
See application file for complete search history.

(56) References Cited

U.S. PATENT DOCUMENTS

| | | | | |
|---|---|---|---|---|
| 3,565,107 A | * | 2/1971 | Bunch | F16K 15/03 137/515.7 |
| 3,720,228 A | * | 3/1973 | Wheatley, Jr. | F16K 15/03 15/104.062 |
| 3,838,706 A | * | 10/1974 | Klenk | E03F 5/0407 137/433 |
| 3,955,596 A | * | 5/1976 | Diaz | F16K 15/03 137/550 |
| 4,027,696 A | * | 6/1977 | Guyton | F16K 15/03 137/527.4 |
| 4,128,111 A | * | 12/1978 | Hansen | F16K 15/03 137/515.7 |
| 4,141,381 A | * | 2/1979 | Eminger | F16K 15/03 137/527.2 |
| 4,230,150 A | * | 10/1980 | Scaramucci | F16K 15/03 137/527 |

(Continued)

*Primary Examiner* — Craig M Schneider
*Assistant Examiner* — Frederick D Soski
(74) *Attorney, Agent, or Firm* — Brouillette Legal Inc.; Robert Brouillette

(57) ABSTRACT

An anti-rat flap member for sewer/draining pipe check is removably attached to the valve body. The valve body defines an interior volume therein which is preferably substantially open and unobstructed (except for the flap member). The flap member acts both as a seal to prevent the back-flow of sewage/drainage water and is normally in a closed position to prevent the passage of rats. The flap member comprises a row of sharp projections attached by known means (such as integrally molded, glued, rivetted or screwed) to the outermost side of the flap member facing the downstream section of the valve. The projections must be at an angle to the surface of the sheet, preferably at an angle which will prevent the rodent from gnawing and biting or even lifting the flap member with their mouth.

12 Claims, 10 Drawing Sheets

(56) References Cited

U.S. PATENT DOCUMENTS

| | | | | |
|---|---|---|---|---|
| 4,249,568 A * | 2/1981 | Duggan | F16K 15/03 | 137/107 |
| 4,265,268 A * | 5/1981 | Hetz | F16K 15/03 | 137/499 |
| 4,307,747 A * | 12/1981 | Carpentier | F16K 15/03 | 251/360 |
| 4,308,894 A * | 1/1982 | Carpentier | F16K 1/2028 | 137/630.15 |
| 4,315,524 A * | 2/1982 | Hoffmann | F16K 15/03 | 137/514.3 |
| 4,321,942 A * | 3/1982 | Duggan | F16K 15/03 | 137/107 |
| 4,404,778 A * | 9/1983 | Ushimaru | E04B 2/00 | 52/517 |
| 4,410,007 A * | 10/1983 | Karpenko | F16K 15/03 | 137/516.29 |
| 4,469,122 A * | 9/1984 | Meek | F16K 15/03 | 137/329.01 |
| 4,502,503 A * | 3/1985 | Karpenko | F16K 15/03 | 137/527.8 |
| 4,601,309 A * | 7/1986 | Chang | F16K 47/00 | 137/514 |
| 4,637,425 A * | 1/1987 | Petersen | E03F 7/04 | 251/74 |
| 4,646,782 A * | 3/1987 | Ezekoye | F16K 47/02 | 417/540 |
| 5,056,548 A * | 10/1991 | Mills | F16K 15/03 | 137/527.2 |
| 5,161,570 A * | 11/1992 | Scaramucci | F16K 15/03 | 137/527.4 |
| 5,341,840 A * | 8/1994 | Manson | F16K 15/03 | 137/904 |
| 5,451,239 A * | 9/1995 | Sewell | A01M 29/30 | 47/33 |
| 5,488,981 A * | 2/1996 | Burkhart | A01M 29/30 | 297/219.11 |
| 5,528,858 A * | 6/1996 | Omdahl | A01M 29/30 | 47/33 |
| 5,596,834 A * | 1/1997 | Ritter | A01M 29/30 | 114/221 R |
| 5,671,769 A * | 9/1997 | Booth | F16K 27/0227 | 137/271 |
| 5,916,023 A * | 6/1999 | Meyer | D06F 58/14 | 34/235 |
| 6,109,297 A * | 8/2000 | Shackelford | F16K 51/00 | 251/118 |
| 6,247,489 B1 * | 6/2001 | Maskell | F16K 27/0227 | 137/527.4 |
| 8,459,298 B1 * | 6/2013 | Valdez | E03F 7/06 | 137/315.16 |
| 9,693,549 B1 * | 7/2017 | Gomez, Jr. | A01M 29/30 | |
| 9,820,478 B1 * | 11/2017 | Balistreri | A01M 29/30 | |
| 10,072,410 B2 * | 9/2018 | Damgaard Jensen | E03F 7/04 | |
| 2001/0023707 A1 * | 9/2001 | Coscarella | F16K 15/03 | 137/420 |
| 2002/0170602 A1 * | 11/2002 | Fetterman, Jr. | F16K 39/024 | 137/512.1 |
| 2003/0221723 A1 * | 12/2003 | Colton, Sr. | F16K 17/105 | 137/218 |
| 2007/0272308 A1 * | 11/2007 | Spears | F16K 15/03 | 137/527.8 |
| 2008/0175726 A1 * | 7/2008 | Bartell | F16L 55/1022 | 417/279 |
| 2009/0095357 A1 * | 4/2009 | Coscarella | F16K 15/03 | 137/218 |
| 2011/0290349 A1 * | 12/2011 | Cozens | E03F 7/04 | 137/527.6 |
| 2012/0152378 A1 * | 6/2012 | Mooney | F16K 15/03 | 137/511 |
| 2012/0255631 A1 * | 10/2012 | Stradinger | F16K 15/03 | 137/511 |
| 2014/0144524 A1 * | 5/2014 | Coscarella | E03F 7/04 | 137/448 |
| 2015/0176261 A1 * | 6/2015 | McAlpine | F16K 15/063 | 137/12 |
| 2015/0247583 A1 * | 9/2015 | Garnett | F16K 1/18 | 137/15.04 |
| 2015/0260310 A1 * | 9/2015 | Bahalul | F16K 37/0041 | 137/557 |
| 2016/0050904 A1 * | 2/2016 | Turner, Jr. | A01M 29/30 | 49/464 |
| 2016/0084392 A1 * | 3/2016 | Horton | F16K 11/00 | 137/12 |
| 2016/0102780 A1 * | 4/2016 | Kennedy | F16K 31/122 | 137/527 |
| 2016/0153565 A1 * | 6/2016 | Poddar | F16K 1/18 | 251/12 |
| 2017/0299073 A1 * | 10/2017 | Parameshwaran | F16K 1/2035 | |
| 2018/0016792 A1 * | 1/2018 | Valdez | F16L 37/02 | |
| 2018/0044906 A1 * | 2/2018 | McAlpine | E03F 7/06 | |
| 2018/0112780 A1 * | 4/2018 | Rain | F16K 25/005 | |
| 2018/0245730 A1 * | 8/2018 | Yaeger | A01M 29/30 | |
| 2018/0363789 A1 * | 12/2018 | Nguyen | E21B 43/26 | |
| 2019/0293193 A1 * | 9/2019 | Fink | F16K 1/42 | |
| 2019/0297790 A1 * | 10/2019 | Hsia | A01G 13/10 | |
| 2020/0236922 A1 * | 7/2020 | Sørensen | A01M 29/30 | |

* cited by examiner

PRIOR ART

ANTI-RAT VALVE AND FLAP THEREFOR

CROSS-REFERENCE TO RELATED APPLICATIONS

There are no cross-related applications.

FIELD OF THE INVENTION

The present invention generally relates to sewer valves. More particularly, the present invention relates to a sewer check valve having a sealing flap which not only prevents the back flow of waste water but is also configured to efficiently prevent the passage of rats.

BACKGROUND OF THE INVENTION

Rodents, such as rats and mice, are animals that are disease carriers as well as being repulsive to many people. Many families are troubled with rats because the rats can enter into the house through a sewage pipe or a drainage installation. To solve this problem, there are usually two methods. One is using a regular sewer check valve which has a function of preventing the passage of drainage or waste water and also works as a rodent barrier when in the closed position. Another one is installing some specific anti-rodent barriers in drainage and sewer pipes.

Generally, a sewer check valve has a sealing flap configured to restrict fluid flow to only one direction. The check valve flap prevents rats or any other small animals from entering a house by blocking their upstream path in a drainage or sewer pipe. Typically, sewage/water check valve flaps are made of plastic such as PVC. Although the flaps may prevent the upstream passage of mice, rats or any other small animals for a certain period, they may be destroyed after a while due to the same animals eating the material away with their sharp teeth. In addition, dedicated anti-rat valves are complicated to install as they require the removal of part of the concrete floor and they prevent the use of cameras to inspect the pipe as their flaps are often provided with sharp lower edges, which may jam the camera wire when the user attempts to retract it.

Several check valves have been disclosed in the prior art. Japanese Patent Application JP2002339427A discloses a valve trap using a high polymer material layer fixed to the valve flap element. As the flap element made of a polymeric material may be destroyed by rats or any other animals, this kind of valve is not absolutely safe for preventing a rat from entering a house.

An example of a valve adapted to prevent the passage of rats is shown in U.S. Pat. No. 8,459,298 to Valdez and Morrison, which discloses a rat check valve. The valve is not able to serve as a seal against back-flow of sewage or water, but will prevent the passage of rats.

Another example of a valve adapted to prevent rats is shown in U.S. Pat. No. 10,072,410 to Karen Elisabeth Damgaard Jensen, which discloses a combined non-return valve and rat killer. The valve is able to serve as a seal against back-flow and as a rat killer. The default valve position is open. A complex sensor system is required for it to be operational.

Yet another example of a valve adapted to prevent rats is shown in published Patent Application no. US 2018/0044906 (McAlpine), which discloses a spring loaded anti-vermin barrier with a specific configuration.

OBJECTS OF THE INVENTION

Therefore, it is necessary to provide a new valve flap which can efficiently prevent the rats from entering inside of a house by gnawing a hole through the flap while simultaneously preventing the back-flow of sewage water.

Another object of this invention is that this new anti-rat valve should be economical and easily reproducible and may be easily retrofitted in existing sewer/drainage sewage/water check valves.

Still another object of the invention is to provide an anti-rat valve which will not damage camera wires when removed.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The aforesaid and other objectives of the present invention are realized by generally providing a new anti-rat valve which could efficiently prevent the rats or other similar animals from entering inside of a building.

In an embodiment of the invention, an anti-rat check valve comprises a valve body and a flap member that is preferably removably attached to the valve body. The valve body defines an interior volume therein which is preferably substantially open and unobstructed (except for the flap member when it is in its closed position). The valve body comprises at least one inlet port and at least one outlet port to permit the fluid to flow into and out of the valve body. The check valve is adapted to be installed in a sewage or a drainage piping system such that the inlet port is connected to the upstream section and the outlet port is connected to the downstream section. The check valve also comprises a flap member provided within the valve body. The flap member is adapted to seal the inlet port when in a normally closed position, but can be displaced by forces from fluid going downstream as to permit the fluid to flow into the interior volume of the valve body and out via the outlet port.

In another embodiment of the invention, the check valve comprises a metallized sheet which is fixed to the downstream face of the flap member. The sheet is preferably round in shape and comprises an outer circumferential edge comprising a row of teeth-like sharp projections. The projections must be at an angle to the surface of the sheet, preferably at an angle which will prevent the rodent from gnawing and biting or even lifting the sealing assembly with their mouth.

In another embodiment of the invention, the metallized sheet is replaced with a metallized band surrounding at least the lower downstream side portion of the flap member. Similarly, the metallized band's lower edge comprises a row of sharp projections attached by known means (such as integrally molded, glued, rivetted or screwed) to the outermost lower side of the flap member facing the downstream section of the pipe. The projections must be at an angle to the surface of the sheet, preferably at an angle which will prevent the rodent from gnawing and biting or even lifting the sealing assembly with their mouth.

In yet another embodiment of the invention, the flap member and the metallized sheet are unitary and are made of metal.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel anti-rat valve will be described hereinafter. Although the invention is described in terms of specific illustrative embodiment(s), it is to be understood that the embodiment(s) described herein are by way of example only and that the scope of the invention is not intended to be limited thereby.

An anti-rat flap for use with a sewer/drainage pipe check valve is provided. The valve generally comprises a valve body comprising at least one inlet port and at least one outlet port and a flap member configured to prevent the counter-flow of fluid circulating in the sewer/drainage pipe.

Figure 1:
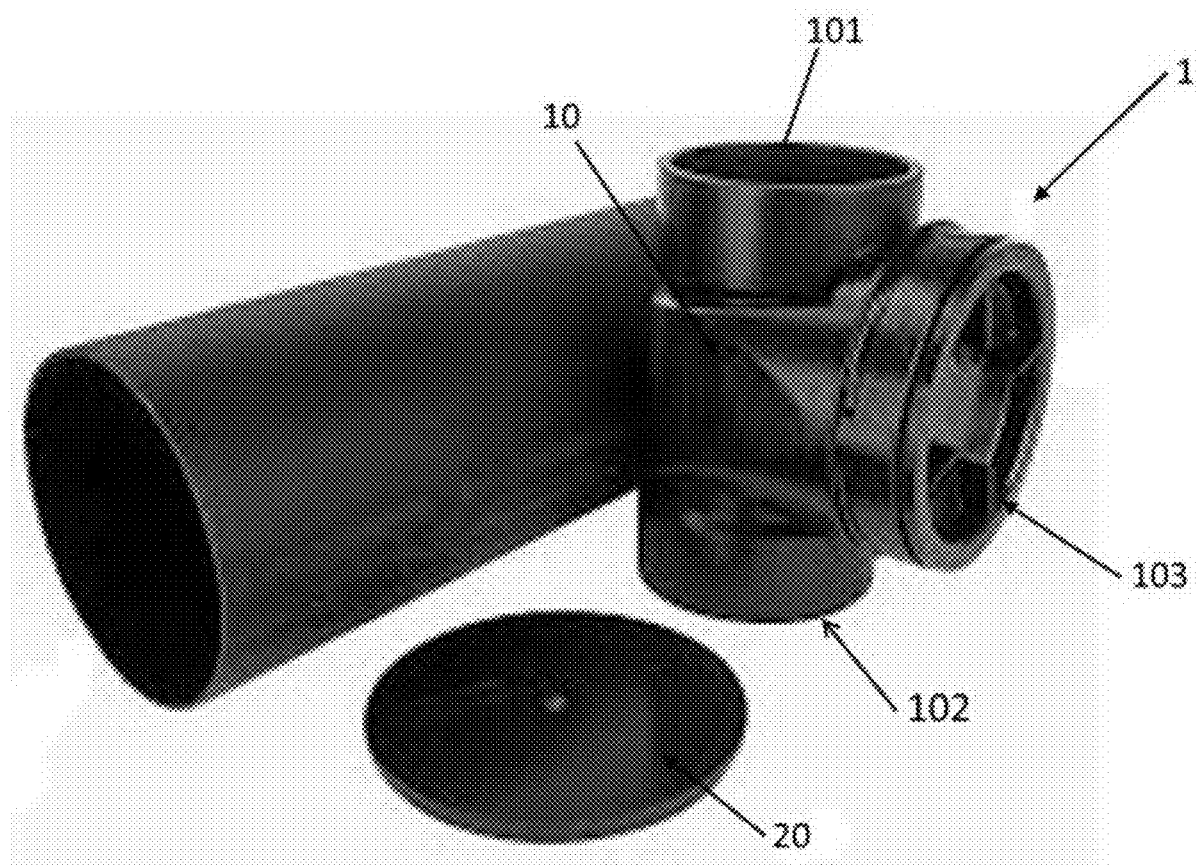
FIG. 1 is a perspective view of embodiment of a standard prior art sewer check valve and a section of pipe made of plastic.

Now referring to FIG. 1, a standard prior art sewer check valve and a section of pipe made of plastic are shown. The check valve 1 comprises a valve body 10 and preferably a cover member 20 that is typically removably attached to the valve body 10 via opening 103. As needed, an extension pipe section may be inserted between the opening 103 and the cover member 20. The valve body 10 defines an interior volume therein which is preferably substantially open and unobstructed (except for the flap member when it is in its closed position). The valve body 10 comprises at least one inlet port 101 and at least one outlet port 102 to permit the fluid flow into and out from the valve body. The check valve is adapted to be installed in a sewage or a drainage piping system such that the inlet port 101 is connected to the upstream section and the outlet port 102 is connected to the downstream section. The connecting method of the port to the piping system can be any conventional means known to people skilled in the art, such as gluing, compression, threaded connections, or other fittings.

The check valve 1 also comprises a flap member 200 provided within the valve body 10. The flap member 200 is adapted to seal the inlet port 101 in a normally closed position, but can be displaced by forces from fluid going downstream to permit the fluid flow into the interior volume of the valve body 10 and out via the outlet port 102.

Understandingly, the inlet port 101 and the outlet port 102 can be disposed in various arrangements. Typically, the inlet port 101 and the outlet port 102 are coaxially aligned so these ports are in a line and the fluid which passes through the check valve 1 flows in a straight direction. In other embodiments, the inlet port 101 and the outlet port 102 can be axially offset at any suitable degrees. It will be understood that the alignment of the inlet port 101 and the outlet port 102 can be selected to accommodate to a particular piping system.

Figure 2:
FIG. 2 is a perspective view of a prior art flap member used with the standard prior art sewer check valve of FIG. 1.

Now referring to FIGS. 1-2, the flap member 200 is preferably removable via opening 103. This is to permit its replacement and the cleaning of the check valve without having to remove the check valve from its piping installation. The flap member 200 generally comprises a sealing portion 201 and a pivot portion 202. The sealing portion 201 has a surface contour that is complementary to the contour of the valve seat in order to provide an effective fluid tight seal in the seated position. Understandably, the diameter of the sealing member 201 is identical to the diameter of the diameter of the valve seat so the sealing member 201 can totally seal the pipe in the seated position. The pivot portion 202 is provided to pivotally attach the flap member 200 to the inner side of the valve seat.

Preferably, the check valve 1 is made from a plastic material such as a thermoset or thermoplastic material as known in the art, such as PVC or CPVC. Understandably, the flap member 200 is also made from a plastic material such as a thermoset or thermoplastic material as known in the art, such as PVC or CPVC.

In some other embodiments, the check valve 1 including the flap member 200 is made from other plastic or polymeric materials such as polypropylene, polyethylene, ABS plastic, acrylics, etc.

Figure 3:
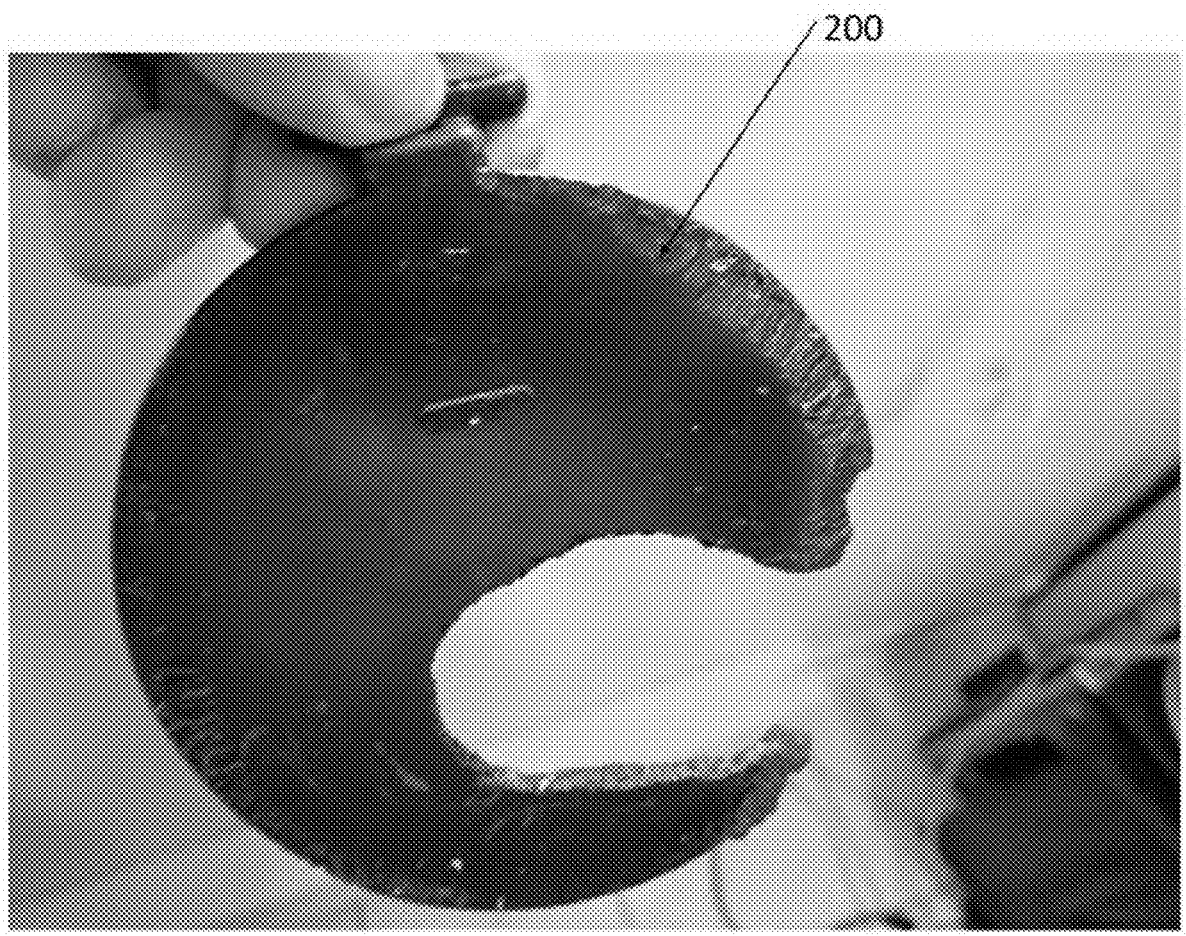
FIG. 3 is a perspective view of a prior art flap member such as the one shown in FIG. 2 which has been pierced by rats.

Now referring to FIG. 3, it is known to person skilled in the art that the flap member 200 is easily pierced by rodents and these animals such as rats can then easily enter inside of a house. Also, the hole will allow unwanted back-flow sewer or drainage water to enter into the building.

Figure 4:
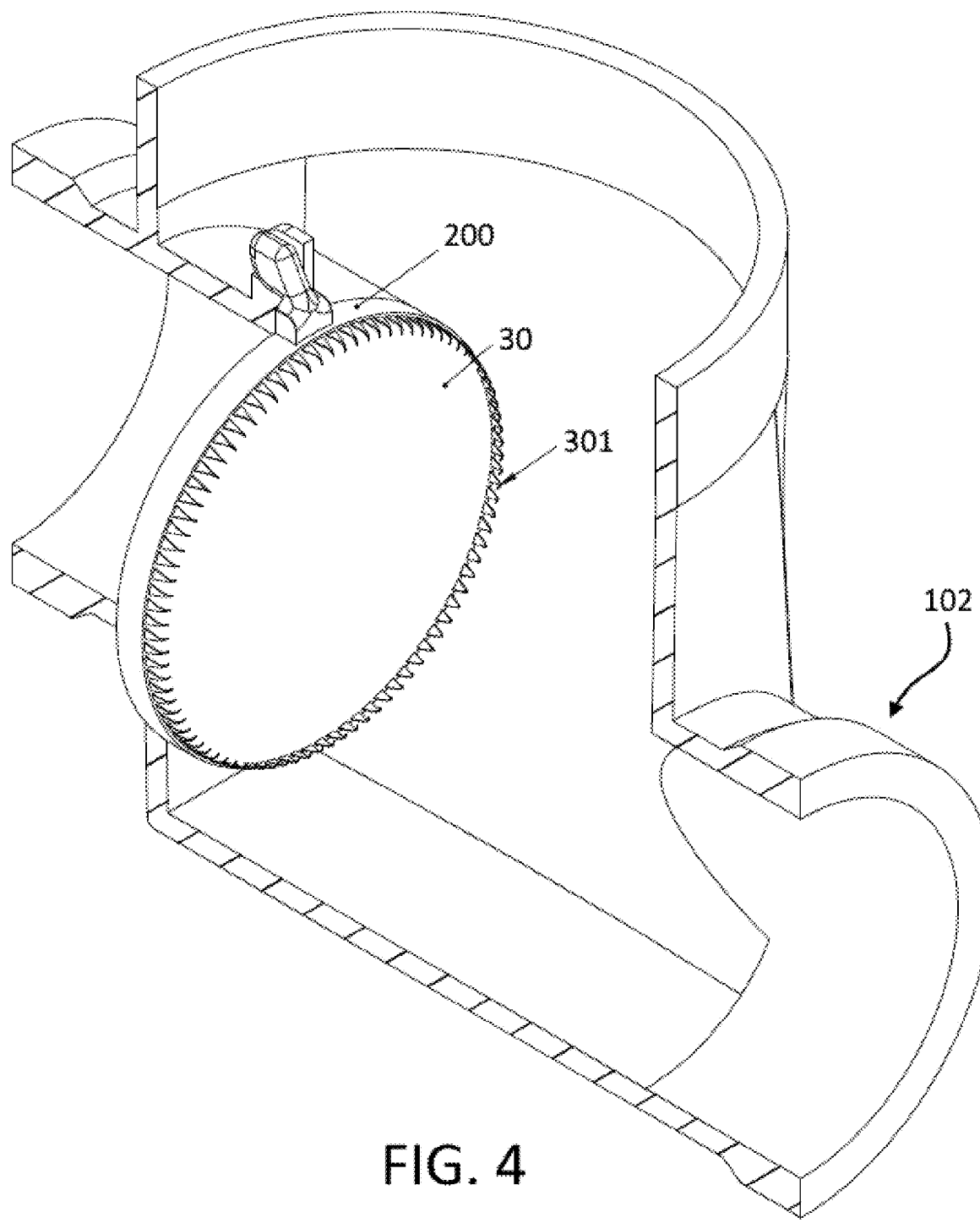
FIG. 4 is a perspective view of a metallized sheet with a row of projections in accordance with the invention for use with a flap member such as the one shown in FIG. 2.

Referring to FIG. 4, the flap member 200 of the invention comprises a metallized sheet 30 which is configured to be attached to the face of the flap member 200 facing the outlet 102. The sheet 30 is of a preferably round shape and comprises a row of sharp projections 301 which looks like a row of teeth. The projections 301 must be at an angle to the surface of the sheet, preferably at an angle which will prevent the rodent from gnawing and biting or even lifting the flap member 200 with their mouth. The row of sharp projections 301 does not need to extend all around the flap but need to extend along the lower portion of the flap.

Figure 5:
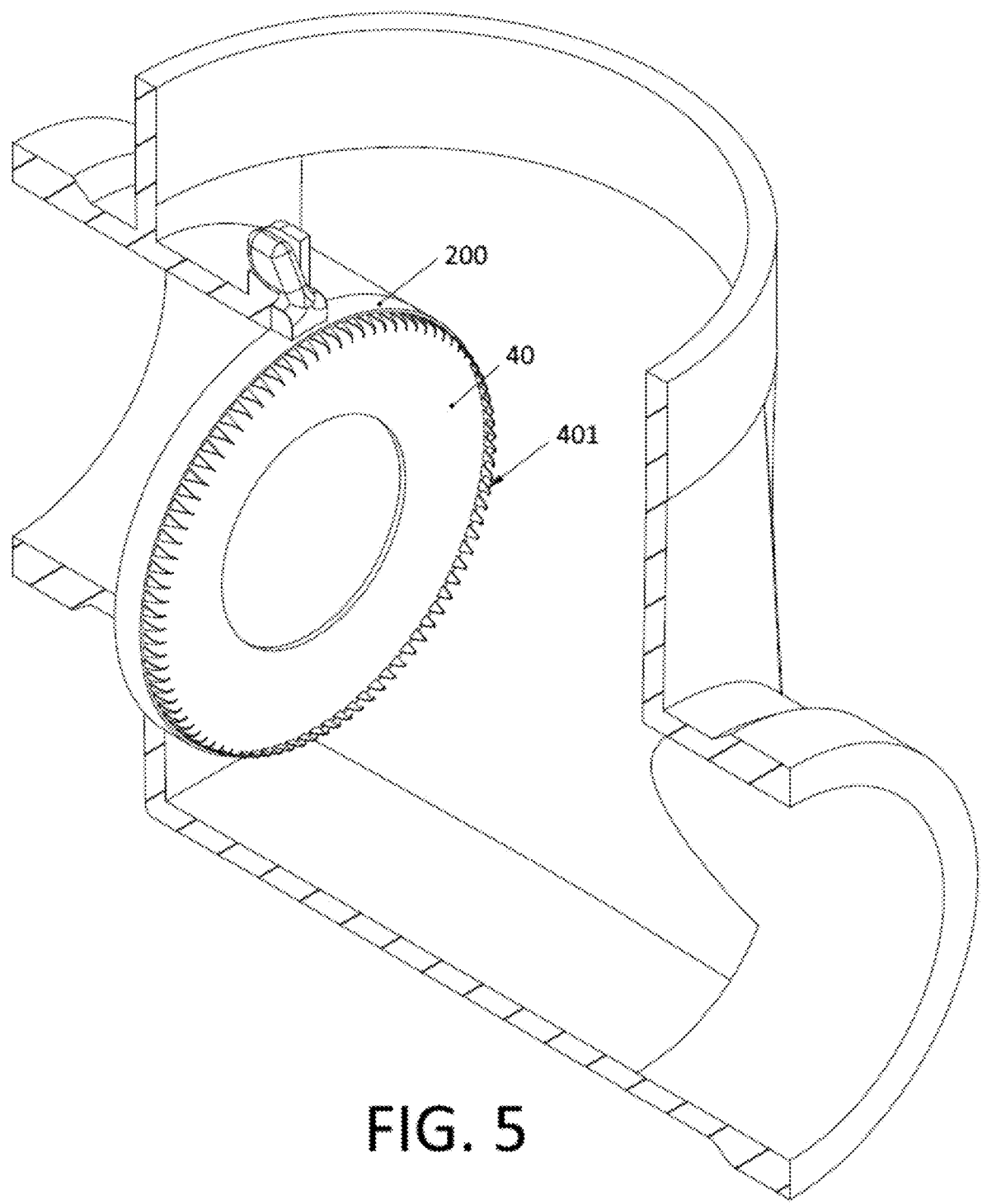
FIG. 5 is a perspective view of a metallized band with a row of projections in accordance with the invention for use with a flap member such as the one shown in FIG. 2.

In another embodiment seen in FIG. 5, the metallized sheet 30 is replaced with a metallized band 40 which may be more economical as less material is necessary for a similar functionality. Similarly, the metallized band 40, whose edge comprises a row of sharp projections 401 looking like a row of teeth, is attached by known means (such as glue, rivets or screws) to the outermost side of the flap member 200 facing the downstream section of the pipe. The projections 401 are to be generally situated on the lower portion of the band 40, but may also be situated on the entire circumference of the metallized band 40. The projections 401 must also be at an angle to the surface of the band 40, preferably at an angle which will prevent the rodent from gnawing and biting or even lifting the flap member 200 with their mouth.

Figure 6:
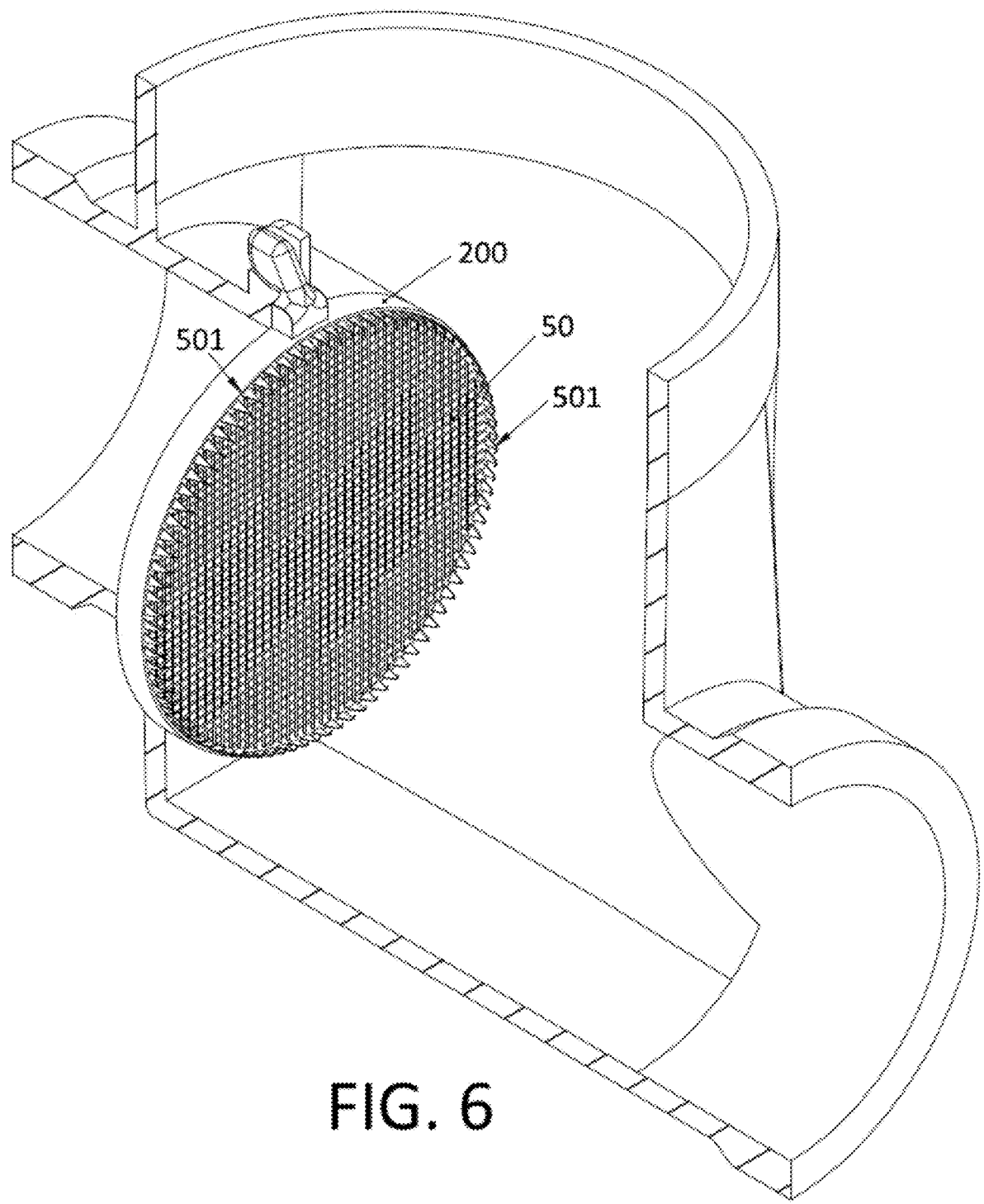
FIG. 6 is a perspective view of a metallic fence with a row of projections in accordance with the invention for use with a flap member such as the one shown in FIG. 2.

FIG. 6 represents an embodiment wherein the metallized sheet 30 is replaced with a metallic fence 50. The fence may require less material to produce compared to the metallized sheet 30 and may thus be a preferred solution when costs or material availability are to be considered. Similarly to the embodiments above, a row of teeth-like projection may be installed on the outer edge of the fence 50. The projections 501 must also be at an angle to the surface of the fence 50, preferably at an angle which will prevent the rodent from gnawing and biting or even lifting the flap member 200 with their mouth.

Figure 7:
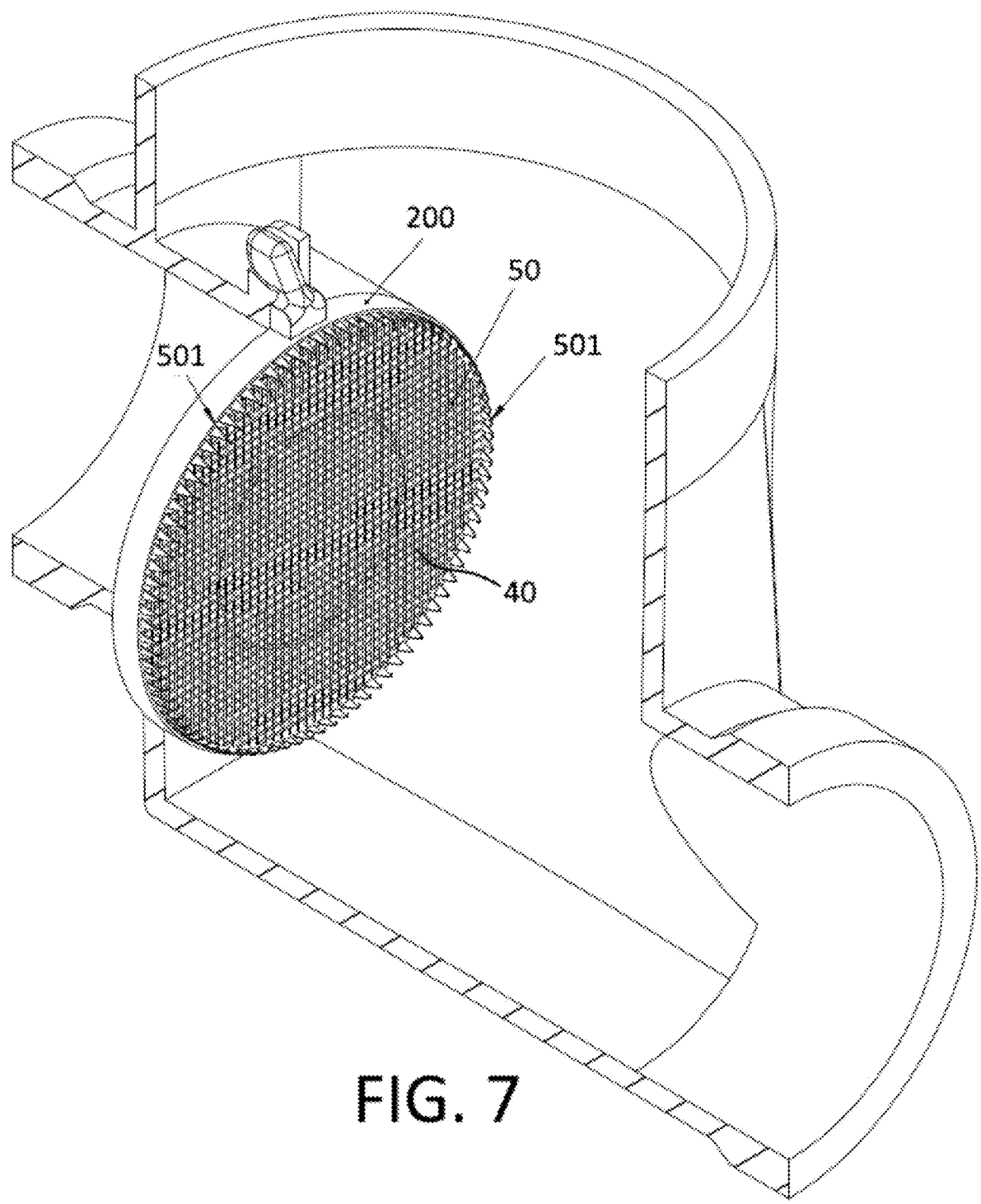
FIG. 7 is a perspective view of a combination of a metallized band covered by a metallic fence with a row of projections in accordance with the invention for use with a flap member such as the one shown in FIG. 2.

Other embodiments, one of which is represented in FIG. 7, may combine two or more superposed metallized parts described above as to increase the protection against rodents. In FIG. 7, a metalized band 40 is covered by a metallic fence 50.

Figure 8:
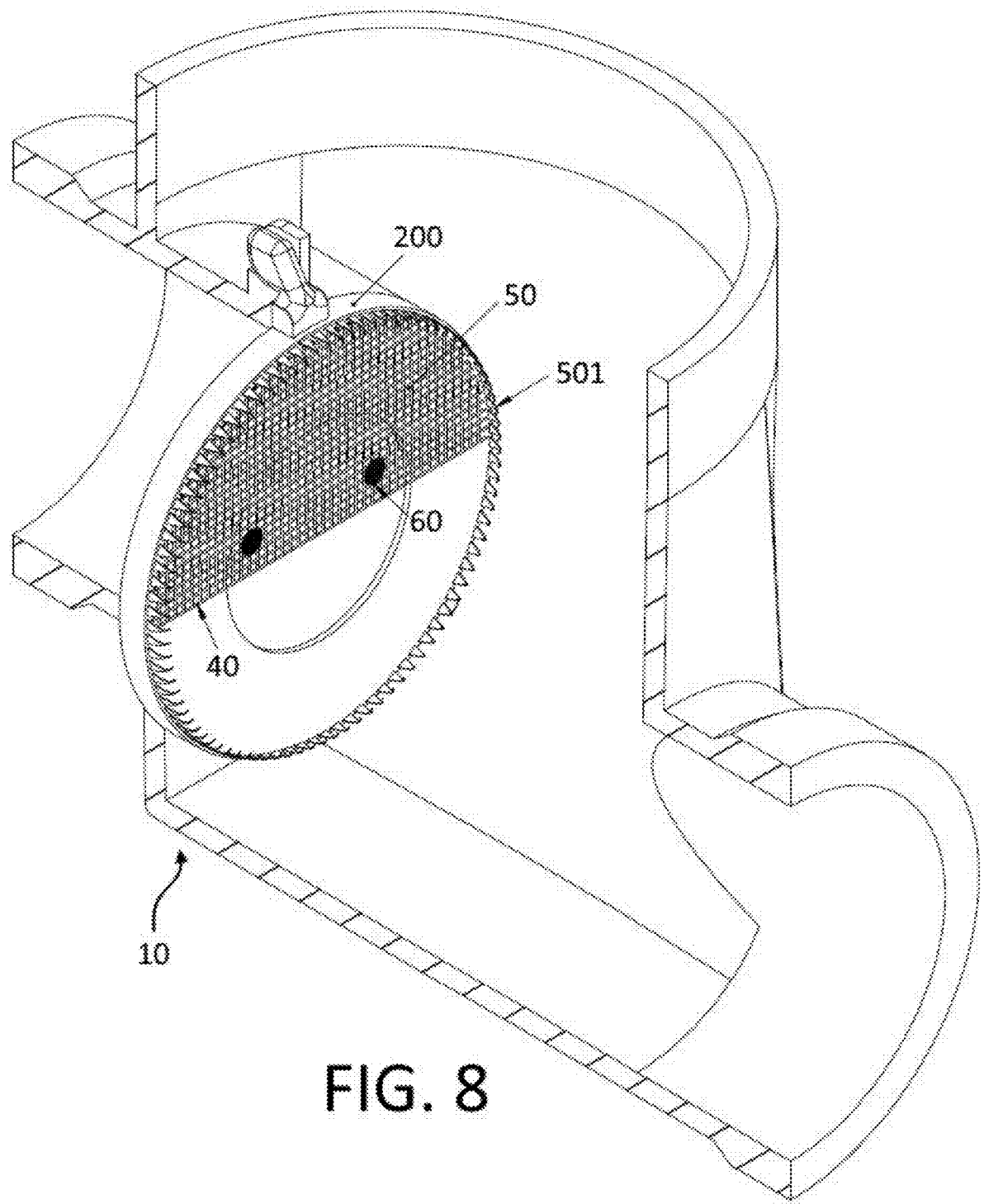
FIG. 8 is a perspective view of apertures in the flap member with a combination of a metallized band covered on its upper half by a metallic fence with a row of projections in accordance with the invention for use with a flap member such as the one shown in FIG. 2.

Now referring to FIG. 8, a set of apertures 60 may be incorporated into the flap 200 and its metallic covers as to allow air to keep flowing from one side of the flap 200 to the other even when its edges are sealed tight against the valve body 10. While not mandatory as the holes 60 might be too small for rodents to go through, it is generally preferred to install a fence 50 over the apertures 60. Apertures 60 may be of any shape suitable to let air flow through the flap 200, one of those shapes being a circle as seen in the embodiment of FIG. 8. Furthermore, the apertures 60 are preferably situated on the upper half section of the flap 200, as it restricts the probability of reflux sewage water going upstream.

Understandably, the anti-rat valve can be made of different sizes according to the size of the pipes, the type of fluid flowing through and so on. The flap member 200, the metallized sheet 30, the metallized band 40 or the metallic fence 50 could be made of aluminum, stainless steel, or other materials known to the person skilled in the art. If the flap member 200 is made of metal, it will preferably be unitary with the metalized sheet 30.

Figure 9:
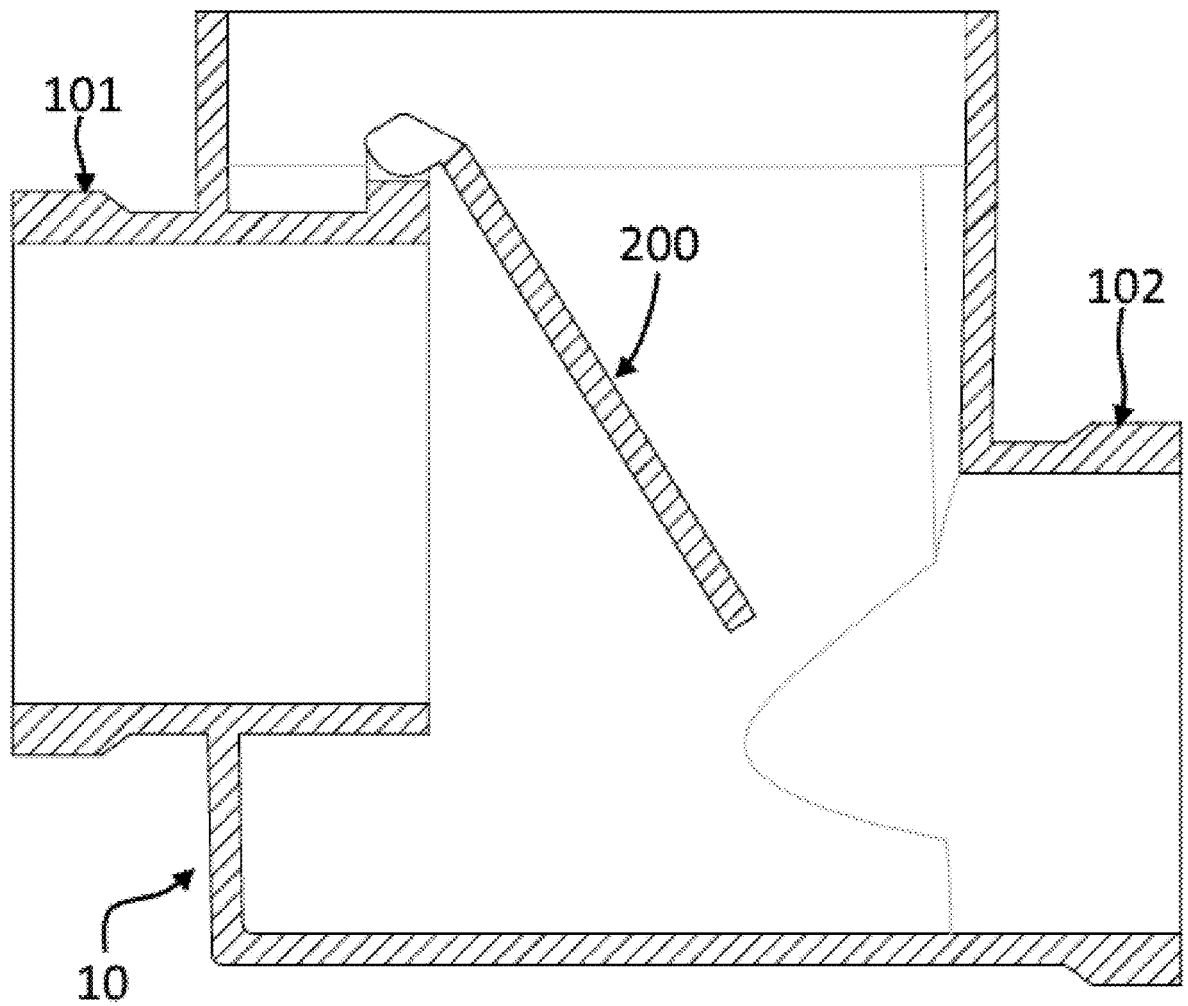
FIG. 9 is a right side view of a check valve body with a height difference between the inlet port and flap member and the bottom of the valve's body and outlet port.

FIG. 9 is an embodiment of the invention wherein the anti-rat valve has an outlet port 102 substantially lower than the inlet 101 and flap member 200 so that the lower edge of the flap 200 is distanced from the bottom of the outlet valve body 10. This height barrier may mostly be useful in discouraging rodents from accessing the flap 200 itself since they might not be able to reach high enough. More so, smaller sewage water reflux going upstream may be stopped at the wall under the flap 200 which may reduce chances of leaks going upward.

Figure 10:
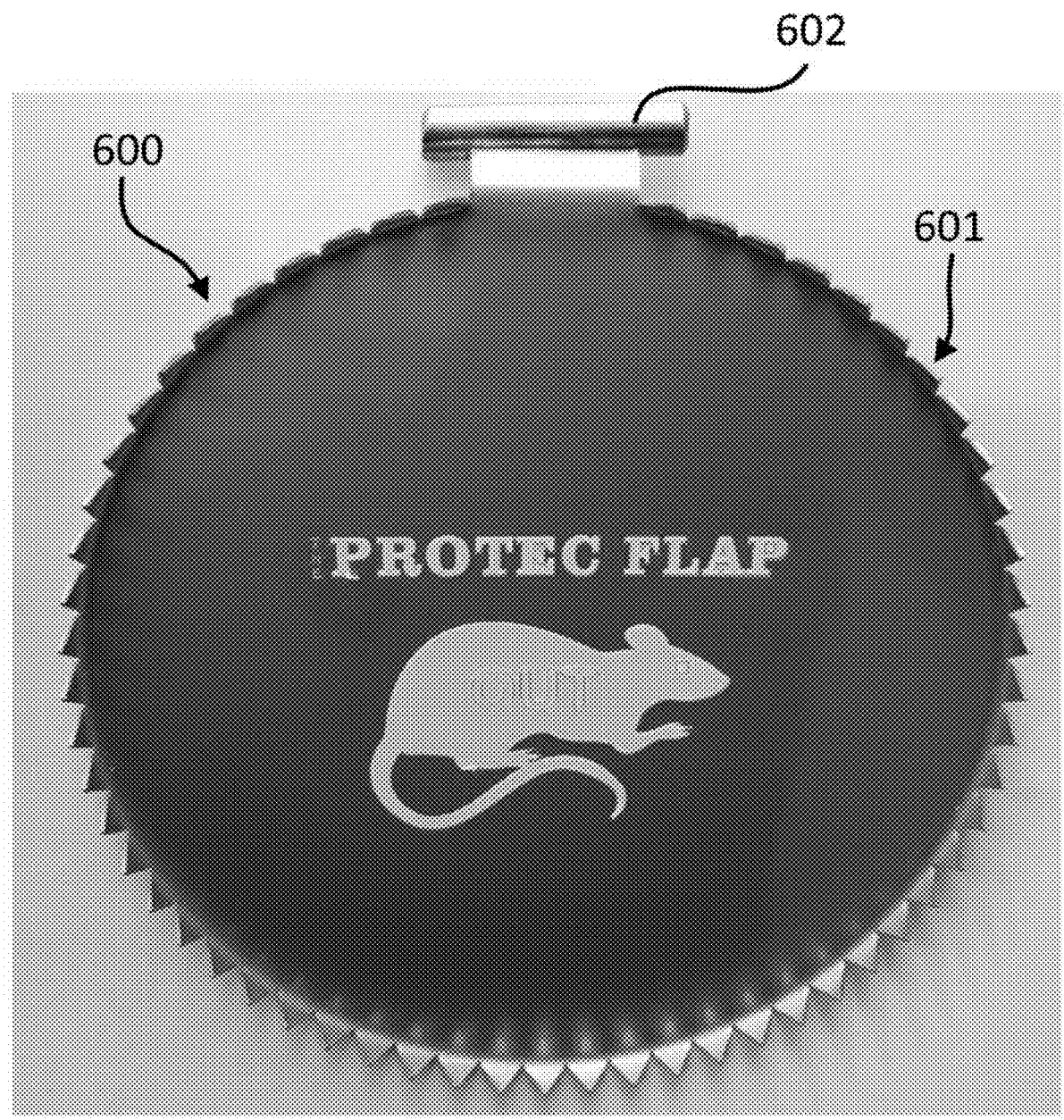
FIG. 10 is a front view of a metallized sheet which consists of the flap member itself.

In an embodiment seen on FIG. 10, a flap member 600 may be entirely made of metal instead of a metallized part attached to a flap member 200 made of plastic. As such, there are no need to attach a metallized sheet 30 to a flap member 200 as both are made together in this case. Projections 601 and a pivot member 602 are also comprised in this embodiment.

As the rats prefer to bite the sealing member 201 from its edges and the new anti-rat flap member 200 comprises a row of sharp projections at the edge of the flap member 200, the rats will not be capable of biting through the flap member 200. This will enhance the ability of preventing the rats from entering into a house.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A valve for deterring an animal from damaging the valve comprising:
   i. a valve body, the valve body defining an interior volume, an inlet port and an outlet port,
   ii. a flap member sealing the inlet port in a normally closed position, and wherein the flap member is displaced by upstream fluid pressure to permit the fluid flow into the interior volume of the valve body and out via the outlet port, the flap member comprising an annular band attached to the outermost side of the flap member facing a downstream section of the valve, the flap member further comprising a fence having a row of sharp projections covering at least a downstream portion of the annular band.

2. The valve as claimed in claim 1, wherein the projections are adapted to prevent the animal from gnawing and biting or even lifting the flap member with their mouth.

3. The valve as claimed in claim 2, wherein the projections extend along a perimeter of the face of the flap member.

4. The valve as claimed in claim 2, wherein the annular band is attached to a lower edge of the face of the flap member.

5. The valve as claimed in claim 1, wherein the outlet port and bottom surface of the interior volume of the valve body are lower than the inlet port and flap member.

6. The valve as claimed in claim 1, wherein the fence is a metallic fence.

7. An anti-rat valve as claimed in claim 1, wherein the flap member is pierced on an upper half of the flap member by at least one aperture in order to let air flow.

8. A flap member for deterring an animal from damaging the flap member, the flap member comprising a sheet attached to an outermost side of the flap member facing a downstream section of a valve body, the flap member further comprising a fence having a row of sharp projections covering at least a downstream portion of the sheet, wherein the sheet is formed as a separate component and positioned between the flap member and the fence.

9. The flap member as claimed in claim 8, wherein the projections are adapted to prevent the animal from gnawing and biting or even lifting the flap member with their mouth.

10. The flap member as claimed in claim 9, wherein the sheet is a metallized sheet.

11. The flap member as claimed in claim 9, wherein the projections extend along a perimeter of a downstream face of the flap member.

12. The flap member as claimed in claim 8, wherein the flap member is pierced on an upper half of the flap member by at least one aperture in order to let air flow.

* * * * *